Patented Sept. 1, 1931

1,821,138

UNITED STATES PATENT OFFICE

LINN BRADLEY, OF MONTCLAIR, NEW JERSEY, AND EDWARD P. McKEEFE, OF PLATTSBURG, NEW YORK, ASSIGNORS TO BRADLEY-McKEEFE CORPORATION, OF NEW YORK, N. Y., A CORPORATION OF NEW YORK

TREATMENT OF BLACK LIQUOR

No Drawing. Application filed May 19, 1921, Serial No. 470,962. Renewed October 25, 1930.

This invention relates to the treatment of the residual liquors from the soda pulp process, commonly known as black liquor, for the recovery therefrom of valuable products. The invention also relates to improvements in the treatment of aluminous materials for the production therefrom of alumina and aluminum, the treatment of such aluminous materials being combined, in a novel and advantageous manner, with the treatment of black liquor.

In the soda pulp process, the chipped wood is subjected to digestion with caustic soda of a strength of about 10.5 to 11.5 Bé., and containing about 92% of the soda as caustic soda (the remainder being sodium carbonate). About 900 gallons of the caustic soda solution are used per cord of wood (measured before chipping), and the digester is heated by direct steam at a pressure which varies from about 90 to 140 pounds, and for a suitable period of time, for example, from 3½ to 5 hours. The liquor is circulated within the digester by the steam during the digestion or cooking. The strength of the liquor and the time of treatment will vary somewhat according to the kind, quality and condition of the wood treated. The caustic soda solution used in the cooking operation is commonly made from soda ash by causticizing a solution thereof with lime. The digester is "blown" at the end of the cook and the pulp is separated from the black liquor and is washed with water. The black liquor separated from the pulp is commonly mixed with a certain amount of the wash water and the mixture constitutes what is commonly referred to as black liquor.

During the digestion in the soda pulp process a very considerable amount of the materials of the wood is dissolved so that the black liquor contains a considerable amount of organic matter in solution, and various sodium compounds. The black liquor thus commonly carries about 11 to 11½ grams of solids per 100 cc., and the total soda in the liquor is equal to about 5.75 percent of sodium carbonate, this determination being made by permitting 100 cc. of the liquor to dry and igniting the residue, burning off the organic matter and leaving the sodium carbonate behind.

The common method of treating the black liquor has been to evaporate a part of the water in evaporators and then feed the concentrated black liquor into an incinerator, the common type being a rotary furnace. The black liquor is further concentrated in the rotary furnace and finally burned, the organic matter being decomposed, and the inorganic matter being concentrated in the black ash, particularly in the form of sodium carbonate. The black ash is then treated with water to dissolve the sodium compounds away from the insoluble residue of carbon, etc., and the resulting solution, after suitable clarification, and after the addition of a further amount of soda ash, to make up for losses which are usual in the soda process (amounting to as much as 15%), is causticized with lime. The soda is thus converted, as far as is practicable, into sodium hydroxide or caustic soda. The lime mud is allowed to settle and the clarified solution of caustic soda is drawn off to be used in the digester. The lime mud is wasted, together with a small percentage of sodium compounds. The organic constituents of the black liquor are consumed or carbonized in the rotary furnace. The only constituents of the black liquor which are commonly recovered are the sodium compounds, the organic constituents of the liquor being lost, together with a small part of the sodium compounds.

According to the present invention, valuable constituents, in addition to the soda, are recovered, while the treatment of the black liquor is carried out in conjunction with the production of alumina from aluminous materials, so that the constituents of the black liquor contribute to the alumina production in a particularly advantageous manner.

The black liquor from the soda pulp process usually contains a considerable amount of soda in the form of free caustic soda. The black liquor also contains considerable amounts of organic material in solution, in combination with sodium as sodium organic compounds. In addition, the black liquor generally contains some sodium carbonate, organic salts such as sodium acetate, etc., and also some fermentable sugars. According to the present invention, we take advantage of certain of these constituents of the black liquor and utilize them in the treatment of aluminous material and the production of alumina, as hereinafter more fully described.

As the source of the alumina finally produced, we may take clay, preferably with a low iron content, and as free as possible from grit, and treat it with an acid such as sulfuric acid, sulphurous acid, phosphoric acid, nitric acid or hydrochloric acid, to dissolve the alumina content of the clay. Even a dilute acid solution will dissolve the alumina if the solution contains a small amount of a soluble fluoride. The resulting solution can be separated from the silica which remains in a precipitated or insoluble form. If hydrochloric acid is used for treating the clay, the resulting solution of aluminum chloride may be treated with calcium hydroxide or calcium carbonate, preferably in a finely divided state. If calcium carbonate is used, carbon dioxide will be given off and may be recovered for use in a later stage of the process. The treatment of the aluminum chloride solution with calcium hydroxide or carbonate gives a precipitate which contains the alumina probably in the form of a basic aluminum carbonate if calcium carbonate has been used, or in the form of aluminum hydroxide if calcium hydroxide has been used, while the calcium goes into solution as calcium chloride. The precipitated aluminum compound is separated from the calcium chloride solution, washed free from calcium chloride and is used for addition to the black liquor, as hereinafter described. The calcium chloride solution can be treated with sulfuric acid or nitre-cake (acid sodium sulfate) to regenerate a solution of hydrochloric acid, or a solution of hydrochloric acid and sodium chloride, for use in treating further quantities of clay, while the calcium will be precipitated as calcium sulfate or gypsum. The gypsum can thus be obtained in a merchantable form. The silica of the clay is obtained as an acid washed precipitated silica and is an excellent material for use as a paper filler and for other purposes, such as a heat insulator, a filtering medium, for fire-resisting paints, etc. The silica can be used either alone or mixed with part or all of the gypsum, e. g., for use as a paper filler. If the clay is treated with sulfuric acid, the alumina can be directly precipitated as a basic precipitate, either in admixture with gypsum, in case lime or calcium carbonate is added to the aluminum sulfate solution, or the basic aluminum compound can be otherwise precipitated without admixture with gypsum.

The precipitated aluminum hydroxide or basic aluminum carbonate, obtainable as above described preferably free from calcium sulphate is added to the black liquor in sufficient amount to combine with the free caustic soda of the black liquor, that is, adding such an amount of the basic aluminum precipitate as the free caustic soda will take into solution as sodium aluminate. Advantage is thus taken of the uncombined caustic soda of the black liquor for the production of a solution of sodium aluminate in the liquor. Such iron and titanium compounds as may be present will remain in an insoluble state, and can be separated from the solution by filtration. The filtered or clarified black liquor thus remaining will contain the sodium aluminate, as well as sodium organic compounds, etc. This liquor may then be treated with carbon dioxide, which may advantageously be that given off when the aluminum chloride solution was treated with calcium carbonate, or carbon dioxide obtained from any other suitable source, such as furnace gases, etc. or sodium bicarbonate may be added directly to the liquor.

The treatment of the liquor containing sodium aluminate with carbon dioxide brings about precipitation of the alumina from solution, with conversion of the sodium aluminate into sodium carbonate. The treatment of the liquor with carbon dioxide will also decompose part of the sodium organic compounds and precipitate organic matter from solution in intimate admixture with the precipitated aluminum hydroxide. That is, the carbonation of this liquor will give an intimately admixed percipitate of aluminum hydroxide and organic matter, while the sodium will be converted to a corresponding extent into sodium carbonate.

The composite precipitate of aluminum hydroxide and organic matter thus obtained is of particular value for use for the production of aluminum, for the reason that it contains the alumina purified from inorganic impurities and admixed with organic matter. By submitting the composite percipitate, after suitable washing to remove admixed and adhering liquor and sodium salts, to destructive distillation, the organic matter will be decomposed and carbonized and will give carbon mixed with alumina. This admixed carbon and alumina is well adapted for addition to the fused bath used in the electrolytic process for the production of metallic aluminum.

The liquor remaining after the precipitation of organic matter and alumina from the liquor referred to above will contain practically all of the original soda, largely in the form of sodium carbonate or bicarbonate, which is causticizible with lime to regenerate caustic soda in solution for further use in the soda pulp process.

Owing to the removal of much of the organic matter originally contained in the black liquor, the resulting liquor can be more readily evaporated without objectionable foaming and the evaporation can be carried to a much further degree than when untreated black liquor is evaporated. The concentration of the solution can thus be carried to such a degree as will correspond to the strength of the solution used originally in the digester; or the solution can be still further concentrated to give a more concentrated solution. A further amount of soda can then be added to the concentrated liquor, if necessary, for example, in the form of soda ash or other causticizible sodium compound to make up for losses, and the solution can then be causticized by treatment with lime; or caustic soda can be added to the liquor after it has been causticized; to make up for losses.

The causticizing treatment results in the conversion of the lime into insoluble calcium carbonate which can be separated and recovered by filtration or otherwise, leaving the causticized liquor which can then be used, after further concentration if necessary, in the treatment of further amounts of wood chips in the digester, or for other purposes.

Instead of first concentrating the liquor after the removal of organic matter and alumina, and then causticizing the concentrated liquor with lime, we may first causticize the liquor before concentration, although we regard the causticizing after concentration as more advantageous and as ordinarily to be recommended. The wash water from the washing of the precipitated organic matter and alumina can be admixed with the liquor from which the organic matter and alumina were precipitated, and the mixed liquors treated together by concentration and causticizing or vice-versa, or the wash water can be separately treated or otherwise used.

The black liquor contains a considerable amount of sodium acetate, etc. We have found that the amount of sodium acetate etc. is such that it can be profitably and advantageously recovered without preventing the subsequent reuse of the causticized liquor for carrying out further digestion of the wood chips. We have found that if the causticized liquor is sufficiently concentrated and contains sufficient sodium acetate, etc., the sodium acetate will, to a considerable extent, crystallize out from the liquor on cooling, and can thus be recovered in a crystalline state. Such amounts of sodium acetate etc. as are not crystallized out will remain in the liquor and will be returned to the digester. So also, if the concentration of the caustic liquor is not carried sufficiently far to cause separation of sodium acetate etc. it will remain in the causticized liquor and will be returned to the digester; unless acetates, etc. have been otherwise removed.

If any of the alumina is precipitated as aluminum acetate, during the carbonation of the black liquor, this will not interfere with the use of the precipitated alumina, as the subsequent destructive distillation will give a suitable mixture of carbon and alumina.

If the sodium acetate etc. is not produced in sufficient amount during one digestion to make it profitable to recover it from the liquor, it can be returned with the concentrated and causticized liquor to the digester and permitted to build up in this way, by returning the liquor one or more times, until there is enough sodium acetate, etc. in the black liquor produced by a subsequent operation to make it profitable to separate it, or to separate out any excess of it. Insofar as the sodium acetate etc., undergoes change in the digester, when returned with the causticized liquor, for example, into the form of sodium oxalate or other causticizible sodium compound, the causticizing of the liquor with lime will convert such compounds into caustic soda which is thus made available in the further carrying out of the soda pulp process.

The wood commonly treated by the soda pulp process is poplar; and it is one advantage of the present invention that it enables larger amounts of bass wood and other woods of the same type to be utilized than have heretofore been utilizable to advantage, owing to the excessive soda losses occurring when these woods are used and to difficulties due to foaming of the black liquor during concentration. Objectionable foaming and excessive soda losses are largely overcome by the present invention owing to the removal of precipitable organic matter from the black liquor before concentration. The present invention, therefore, makes possible the treatment of cellulose-bearing materials which could not be treated economically, or which could be treated only with less advantage, according to the common methods of treatment.

So also, the present invention takes advantage of the free caustic soda of the black liquor, as well as its precipitable organic matter, and utilizes these in the treatment of aluminous material for the production of purified alumina in intimate admixture with the precipitated organic matter, and, ultimately, after destructive distillation, in intimate admixture with carbon. The treatment of the black liquor is thus advantageously combined with the treatment of the aluminous material.

The aluminous material (preferably amorphous) which is used as the source of the alumina may vary. Instead of using clay, however, other aluminous materials, such as slate, sericite, leucite, feldspars, or certain ashes from anthracite coal which have undergone heat treatment in the furnace, may be used and suitably treated for the production therefrom of alumina in a form adapted for addition to the black liquor to combine with the free caustic soda thereof to form sodium aluminate. The free caustic soda of the black liquor is thus used to advantage and ultimately recovered in a causticizible form such that it can be used for the production of further amounts of caustic soda for use in the soda pulp process, or for other purposes.

In treating the black liquor, containing the alumina in solution, with carbon dioxide, the carbonation can be carried to the point where all of the alumina and as much as possible of the organic matter are precipitated, or the process may be stopped at any time after complete precipitation of the alumina, even though the precipitable organic matter has not been completely precipitated. Varying amounts of admixed organic matter and aluminum hydroxide can thus be produced, and the process is thus capable of some regulation in this regard. The destructive distillation of the admixed aluminum hydroxide and organic matter will give products of a gaseous or liquid character, or both, which may be recovered as valuable by-products of the operation. If the alumina is obtained as free as possible from organic matter, by avoiding the precipitation of any greater amount of organic matter than is precipitated up to the time of substantially complete precipitation of alumina, the alumina will, of course, be admixed with a correspondingly smaller amount of carbon after destructive distillation.

While ordinarily, we regard it as more advantageous to utilize the black liquor without preliminary concentration, we may, nevertheless, subject the black liquor to a preliminary concentration before utilizing the free caustic soda thereof for forming the sodium aluminate, so that a more concentrated liquor will be used, and hence a more concentrated solution of caustic soda, although care should be taken that no considerable amount of caustic soda is converted into sodium carbonate during the concentration. When such a concentrated liquor is utilized, the precipitation of the alumina, together with more or less organic matter in admixture, will take place from a more concentrated liquor, and the remaining solution of sodium carbonate or bicarbonate, will also be more concentrated. The process will otherwise be similar to that carried out without such preliminary concentration, although the amount of further concentration will be correspondingly reduced, and a lesser amount of a more concentrated liquor will be handled during the precipitation of organic matter and alumina.

It will thus be seen that the present invention involves a simple and advantageous method of purifying aluminous compounds and of treating black liquor, in which the constituents of the black liquor are used to particular advantage in conjunction with the purification of the aluminous material, and in which various valuable products of the black liquor are recovered; as well as a method in which the greater portion of the soda content of the black liquor is ultimately recovered for reuse. The liquor, after the precipitation of organic matter and alumina therefrom, may be concentrated and then causticized, or causticized and then concentrated, (either alone or after admixture with wash water from the washing of the precipitated alumina and organic matter) to give a caustic liquor which may be directly returned to the digester for further use, with the addition thereto of sufficient added caustic, or of sufficient added sodium carbonate or soda ash before causticizing, to make up for losses.

In referring, in the appended claims, to the steps of concentrating and causticizing the black liquor, after the precipitation of organic matter therefrom, we intend to include these steps whether the concentration precedes or follows the causticizing step, except where the sequence of the steps is definitely indicated.

Instead of causticizing the sodium carbonate or bicarbonate remaining in the liquor after the carbonation and removal of precipitated material we may, in some cases, recover sodium carbonate or bicarbonate as such.

Cellulosic materials other than wood may be treated and the residual liquor subjected to operations similar to those described for residual liquors resulting from cooking woodchips.

In the claims the term "black liquor" is intended to cover all residual liquors, resulting from the cooking of cellulose bearing materials, which contain uncombined alkali metal hydroxide.

We claim:

1. The method of treating black liquor, which comprises adding thereto an aluminum compound capable of combining with the free caustic alkali to form alkali metal aluminate, and precipitating aluminum hydroxide substantially free from inorganic impurities from the resulting solution.

2. The method of treating black liquor, which comprises adding thereto an aluminum compound combining with the free caustic alkali to form alkali metal aluminate, and precipitating aluminum hydroxide substantially free from inorganic impurities from the resulting solution in admixture with organic matter.

3. The method of treating black liquor, which comprises forming alkali metal aluminate with the free caustic alkali of the liquor, and precipitating aluminum hydroxide and organic matter from the liquor by treatment with carbon dioxide.

4. The method of treating black liquor, which comprises forming a solution of alkali metal aluminate therein, precipitating aluminum hydroxide and organic matter therefrom in intimate admixture, and subjecting the composite precipitate to destructive distillation to give an intimate admixture of carbon and alumina.

5. The method of treating black liquor, which comprises forming a solution of alkali metal aluminate therein, precipitating aluminum hydroxide and organic matter therefrom in intimate admixture, subjecting the composite precipitate to destructive distillation to give an intimate admixture of carbon and alumina, and utilizing the resulting mixture of carbon and alumina in the electrolytic fused bath process for the production of metallic aluminum.

6. The method of producing alumina from aluminous material, which comprises dissolving the aluminum in an acid, precipitating the aluminum from solution in the form of a basic aluminum compound, adding such compound to black liquor to form alkali metal aluminate with the free caustic alkali thereof, separating the resulting solution from insoluble impurities, and precipitating the alumina from the resulting solution.

7. The method of producing alumina from aluminous materials, which comprises dissolving the aluminum in an acid, precipitating the aluminum from solution in the form of a basic aluminum compound, adding such compound to black liquor to form alkali metal aluminate with the free caustic alkali thereof, separating the resulting solution from insoluble impurities, precipitating aluminum hydroxide from the resulting solution in admixture with organic matter, and subjecting the composite precipitate to destructive distillation to give an intimate mixture of alumina and carbon.

8. The method of producing alumina from aluminum bearing silicate which comprises treating the silicate with an acidic compound in the presence of water and a regulated amount of a fluorine compound, separating the solution from the residue, and treating the solution with an agent capable of causing the precipitation of a basic aluminum compound from the solution, adding such compound to black liquor to form alkali metal aluminate with the free caustic alkali thereof, separating the resulting solution from insoluble impurities and precipitating alumina from the resulting solution.

9. The method of producing alumina from aluminum bearing material which comprises treating the material with an acidic compound in the presence of water, separating the solution from the residue, treating the solution so obtained with an agent capable of causing the precipitation of a basic aluminum compound from the solution, adding such compound to black liquor to form alkali aluminate with the free caustic alkali metal thereof, separating the resulting solution from the insoluble impurities whereby to free the alkali metal aluminate from insoluble impurities and precipitating alumina from the latter solution.

In testimony whereof we affix our signatures.

LINN BRADLEY.
EDWARD P. McKEEFE.